United States Patent
Be'ery et al.

(10) Patent No.: US 10,609,048 B2
(45) Date of Patent: *Mar. 31, 2020

(54) SYSTEMS AND METHODS FOR THE DETECTION OF ADVANCED ATTACKERS USING CLIENT SIDE HONEYTOKENS

(71) Applicant: MICROSOFT TECHNOLOGY LICENSING, LLC, Redmond, WA (US)

(72) Inventors: Tal Arieh Be'ery, Petach-Tikva (IL); Itai Grady, Ramat-HaSharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,124

(22) Filed: Aug. 27, 2018

(65) Prior Publication Data

US 2019/0207956 A1  Jul. 4, 2019

Related U.S. Application Data

(63) Continuation of application No. 14/986,753, filed on Jan. 4, 2016, now Pat. No. 10,063,571.

(51) Int. Cl.
  *G06F 11/00* (2006.01)
  *H04L 29/06* (2006.01)
(52) U.S. Cl.
  CPC ...... *H04L 63/1416* (2013.01); *H04L 63/0428* (2013.01); *H04L 63/083* (2013.01);
  (Continued)
(58) Field of Classification Search
  CPC ........................... H04L 63/1416; H04L 63/10
  See application file for complete search history.

(56) References Cited

U.S. PATENT DOCUMENTS

| 7,725,937 B1 * | 5/2010 | Levy | G06F 21/554 |
| | | | 713/187 |
| 7,831,522 B1 * | 11/2010 | Satish | G06Q 20/02 |
| | | | 705/76 |

(Continued)

OTHER PUBLICATIONS

Jogdand et al., "Survey of different IDS using honeytoken based techniques to mitigate cyber threats," 2016 International Conference on Electrical, Electronics, and Optimization Techniques (ICEEOT) Year: 2016 pp. 802-807.*

(Continued)

*Primary Examiner* — Roderick Tolentino
(74) *Attorney, Agent, or Firm* — Workman Nydegger

(57) ABSTRACT

There is provided a method for detecting a malicious attempt to access a service providing server using credentials of a client terminal in a network, the method performed by a malicious event detection server analyzing packets transmitted over the network, comprising: analyzing at least one login-credential associated with an attempt to obtain authentication to access the service providing server to determine whether the login-credential matches an invalid login-credential included in a set of honeytoken-credentials, wherein the set of honeytoken-credentials is stored on a local memory of the client terminal, wherein the set of honeytoken-credentials includes the invalid login-credential and a valid login-credential, wherein the invalid login-credential is invalid for authentication of the client terminal to access the service providing server and the valid login-credential is valid for authentication of the client terminal to access the service providing server; and identifying a malicious event when the login-credential matches the invalid login-credential.

25 Claims, 12 Drawing Sheets

(52) U.S. Cl.
CPC .......... *H04L 63/10* (2013.01); *H04L 63/1408* (2013.01); *H04L 63/1491* (2013.01)

(56) References Cited

U.S. PATENT DOCUMENTS

| | | | | |
|---|---|---|---|---|
| 8,880,435 | B1* | 11/2014 | Catlett | G06Q 20/10 |
| | | | | 705/75 |
| 9,491,157 | B1* | 11/2016 | Amdahl | H04L 63/08 |
| 2005/0198506 | A1* | 9/2005 | Qi | H04L 9/3213 |
| | | | | 713/170 |
| 2012/0042364 | A1* | 2/2012 | Hebert | G06F 21/46 |
| | | | | 726/6 |
| 2012/0233222 | A1* | 9/2012 | Roesch | H04L 63/1408 |
| | | | | 707/812 |
| 2013/0263226 | A1* | 10/2013 | Sudia | H04L 63/1466 |
| | | | | 726/4 |
| 2014/0157390 | A1* | 6/2014 | Lurey | G06F 21/123 |
| | | | | 726/7 |
| 2015/0013006 | A1* | 1/2015 | Shulman | H04L 63/1416 |
| | | | | 726/23 |
| 2015/0189395 | A1* | 7/2015 | Garvel | H04N 21/812 |
| | | | | 725/32 |
| 2016/0180087 | A1* | 6/2016 | Edwards | G06F 21/566 |
| | | | | 726/24 |
| 2016/0373430 | A1* | 12/2016 | Bhat | H04L 63/0823 |
| 2016/0381023 | A1* | 12/2016 | Dulce | H04L 63/10 |
| | | | | 726/9 |

OTHER PUBLICATIONS

Tanaka et al., "Analysis of malware download sites by focusing on time series variation of malware," 2016 IEEE Symposium on Computers and Communication (ISCC) Year: 2016 pp. 173-179.*
"Office Action Issued in European Patent Application No. 16826858.9", dated May 3, 2019, 5 Pages.( MS#358685-EP-EPT).

* cited by examiner

FIG. 3

FIG. 6

SYSTEMS AND METHODS FOR THE DETECTION OF ADVANCED ATTACKERS USING CLIENT SIDE HONEYTOKENS

CROSS-REFERENCE TO RELATED APPLICATIONS

This application is a continuation of U.S. patent application Ser. No. 14/986,753 filed on Jan. 4, 2016, entitled "SYSTEMS AND METHODS FOR THE DETECTION OF ADVANCED ATTACKERS USING CLIENT SIDE HONEYTOKENS," which issued as U.S. Pat. No. 10,063,571 on Aug. 28, 2018, and which application is expressly incorporated herein by reference in its entirety.

BACKGROUND OF THE INVENTION

Honeytokens are fake entries, planted in computer assets that belong to a protected network, and their usage is monitored. While legitimate users only use legitimate entries within the computer network, and are not expected to use honeytokens, malicious entities may attempt using the honeytoken to perform malicious activity. Therefore, when use of a honeytoken is detected, the computer from which the honeytoken was used is assumed to be compromised.

An example of a honeytoken is a fake account (e.g., of a human user, or of a computing client) planted on an administrative server, such as a Domain Controller (DC). Malicious entities may be detected when they attempt to use the fake account, for example, in an attempt to access a restricted data.

BRIEF SUMMARY

As used herein, the term valid login-credential may refer to user related identity data and/or login credential(s) that may be used to identify the user (e.g., human, client terminal) for authentication and/or authorization, such as to obtain access to data and/or services provided by a service providing server. Optionally, the valid login-credential is a user-ID (e.g., username, login name) of a real user having an entry in a network administration database.

As used herein, the term invalid login-credential may refer to user related identity data and/or login credential(s) that cannot be used to identify the user for authentication and/or authorization (optionally to access data and/or services provided by the service providing server), since the invalid login-credentials are fake. Optionally, the invalid login-credential is related to a password associated with the user-ID, for example, the invalid login-credential may be a fake password, and/or derived from a password (e.g., calculated from the password, such as a hash value, and/or accessed using the password, and/or including the password), for example, public key infrastructure (PKI) certificate, tokens, and tickets (e.g., Kerberos tickets).

As used herein, the term (set of) honeytoken-credentials may refer to a set of invalid login-credential(s) (optionally a fake password or fake data related to the password) and valid login-credential(s) (optionally a real user-ID such as a user-name). The honeytoken-credentials are stored in a memory of a client terminal, as described herein.

An aspect of some embodiments relates to systems and/or methods (e.g., code stored in a program store executed by a processor of a server) that distribute honeytoken-credential storing code to one or more clients. The honeytoken-credential storing code includes instructions that when executed by the processor of the respective client terminal store honeytoken-credentials on the local memory of the respective client terminal. The honeytoken-credentials include valid login-credentials (e.g., username, user-ID) and invalid login-credentials (e.g., fake password).

An aspect of some embodiments relates to systems and/or methods (e.g., code stored in a program store executed by a processor of a server) that detect a malicious attempt to access a service providing server using honeytoken-credentials including valid login-credentials and invalid login-credentials, where the honey-token credentials are stored in the memory of a valid client terminal(s) of the valid user (i.e., by honeytoken-credential storing code).

Network level monitoring is performed (e.g., by a malicious event detection server) to detect network level usage of the invalid login-credential (optionally usage of the honeytoken-credential including the set of valid login-credentials and invalid login-credentials), optionally in an attempt to gain access to the service providing server, for example, by analyzing tickets, passwords, and/or responses to server challenges, which may have been rejected when the attempts is using the fake password or fake data related to the password.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 3 is a screen capture of a memory dump showing an empty password stored as one of the honeytoken-credentials, in accordance with some embodiments;

FIG. 6 is another screen capture of a memory dump showing valid login-credentials and invalid login-credentials as stored honeytoken-credentials, in accordance with some embodiments;

DETAILED DESCRIPTION OF THE PREFERRED EMBODIMENTS

Figure 1:
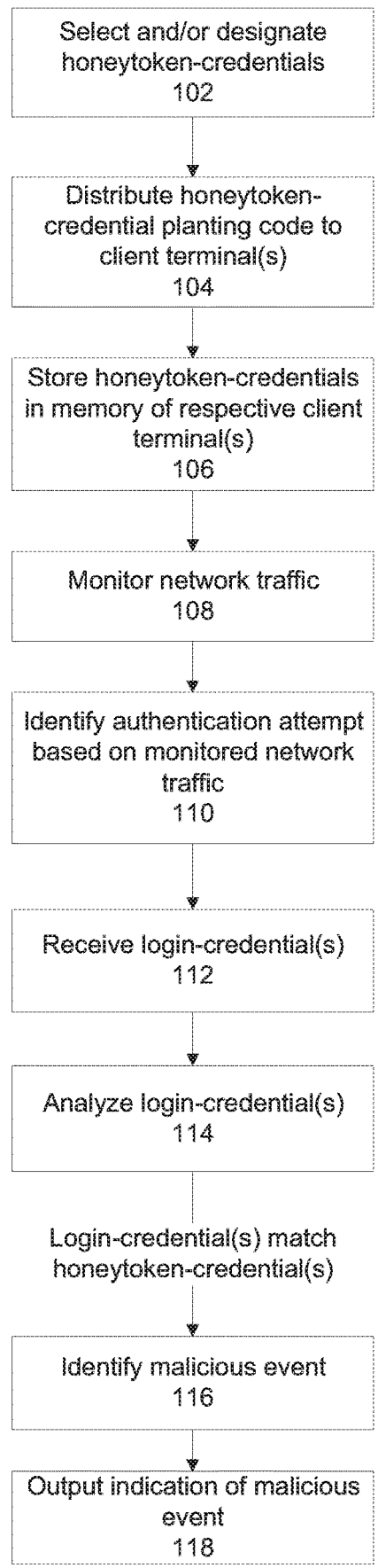
FIG. 1 is a flowchart of a method for detecting a malicious attempt to access a service providing server using honeytoken-credentials of an authorized user stored in the memory of a client terminal, in accordance with some embodiments.

An aspect of some embodiments relates to systems and/or methods (e.g., code stored in a program store executed by a processor of a server) that distribute honeytoken-credentials storing code to one or more clients. The honeytoken-credentials storing code includes instructions that when executed by the processor of the respective client terminal stores honeytoken-credentials on the local memory of the respective client terminal. The honeytoken-credentials represent the login-credentials required to obtain authentication and/or authorization to access a service providing server. The honeytoken-credentials include an invalid login-credential(s) and a valid login-credential(s). The invalid login-credential(s) fails authentication when used in an attempt to access the service providing server. The valid login-credential(s) is a real login-credential of a user, optionally a valid user entry (e.g., of a valid user), which may be stored, for example, in an administrative server and/or security authentication server. A malicious entity, which accesses the client terminal is able to retrieve the stored honeytoken-credentials from the memory of the client terminal, for example, by using software that displays contents of the memory. The malicious entity may verify the existence of the valid user, for example, by querying the administrative server. The stored honeytoken-credentials allow for detecting a malicious attempt to access the service providing server by the malicious entity using the valid login-credential (e.g., user-ID, username) and the invalid login-credential. Since the valid login-credential of the honeytoken-credentials is associated with a valid user (that may be verified by querying the administrative server), the honeytoken-credentials present themselves as credible to a malicious entity, which is more likely to use the honeytoken-credentials in trying to obtain authorization to access the service providing server, which increases the probability of identifying such malicious events, for example, in comparison to providing invalid login-credentials which are not associated with any valid users, which an attacker might more easily detect.

It is noted that the systems and/or methods described herein store on a memory of a client terminal, a set of honeytoken-credentials, which include valid login-credentials, optionally a real user-ID (e.g., username) and invalid login-credentials, optionally a fake password or fake data related (e.g., calculatable from or obtainable using) to a real password, which is different compared to other methods, for example, that stored a fake user-ID, and monitor usage of the fake user-ID for attempts to authenticate the fake user. Such methods may not relate to a password or data related to the password.

An aspect of some embodiments relates to systems and/or methods (e.g., code stored in a program store executed by a processor of a server) that detect a malicious attempt to access a service providing server using honeytoken-credentials that include valid login-credentials of a valid user (e.g., having an entry in a user dataset of an administrative server and/or security authentication server) and invalid login-credentials. The honey-token credentials are stored in the memory of a valid client terminal(s) of the valid user (i.e., by honeytoken-credential storing code).

Use of the invalid login-credentials (optionally use of the honeytoken-credential that includes the invalid login-credentials) is detected at the network level by network level monitoring at a network monitoring node. Network traffic is monitored to detect usage of the invalid login-credential(s) that were stored on the memory of the client terminal, optionally to gain access, authentication, and/or authorization to data stored on, and/or services provide by the service providing server. Optionally, network traffic is monitored to detect a rejection of the attempt to authenticate, authorize, and/or gain access to the service providing server using the invalid login-credentials.

Network traffic is monitored to detect a login-failure event, in which access to the service providing server with a login-failure credential is denied (e.g., by the security authentication server). The login-failure-credential event is analyzed, by a comparison to the honeytoken-credentials. A malicious event is identified when the login-failure-credentials match the stored honeytoken-credentials, representing, for example, a malicious entity that achieved unauthorized access to the client terminal, stole the honeytoken-credentials of the valid user from the memory of the client terminal, and tried to obtain authorized access to the service providing server using the valid login-credentials and invalid login-credentials of the honeytoken-credentials. Analyzing data extracted from network traffic (e.g., tickets, responses to challenges) allows identification of malicious events based on password related or derived data (e.g., a hash using the password, or a password used to encrypt a timestamp), for example, in comparison to analyzing logs which may not contain such password related or derived data.

The systems and/or methods described herein provide a technical solution to the technical problem of detecting malicious attempts to access service providing servers in a network environment by unauthorized malicious entities trying to obtain remote access to the service providing server over the network.

The systems and/or methods described herein relate to storing honeytoken-credentials in a physical memory (and/or virtual memory associated with a physical storage device) of a client terminal, optionally a local memory. New data is created in the form of the stored honeytoken-credentials by honeytoken-credential storing code running on the client terminal. A physical network is monitored to detect login-failure events in which the honeytoken credentials are used by a malicious entity in an attempt to obtain remote access to a service providing server.

The systems and/or methods described herein improve performance of computer(s) (e.g., client terminal, service providing server) and/or network, by detecting and optionally removing malicious threats from the computer(s) and/or network. The presence of the malicious entity performing malicious activities within the computer(s) and/or network may damage the computer(s) and/or network, and/or may cause reduced performance, for example, due to an increase in network traffic related to the authorized access, and/or a reduction in processing resources due to a redirection of processing resources to the malicious activity.

Accordingly, the systems and/or methods described herein are necessarily rooted in computer technology to overcome an actual technical problem arising in computer networks.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

As used herein, the terms authentication and authorization are sometimes interchangeable, and usage of one term does not necessarily imply exclusion of the other term. Sometimes usage of one term may include both terms. For example, the malicious event may be detected by the systems and/or methods described herein as an attempt by the malicious entity to authentication itself to an authentication server using the honeytoken-credentials and optionally including the valid login-credential of the valid user. In another example, the malicious event may be detected by the systems and/or methods described herein as an attempt by the malicious entity to obtain authorization by a server to access hosted data, for example, using a fake Kerberos ticket created using the honeytoken-credentials and optionally including the valid login-credential of the valid user. The systems and/or methods described herein may detect both authentication and authorization attempts.

Figure 2:
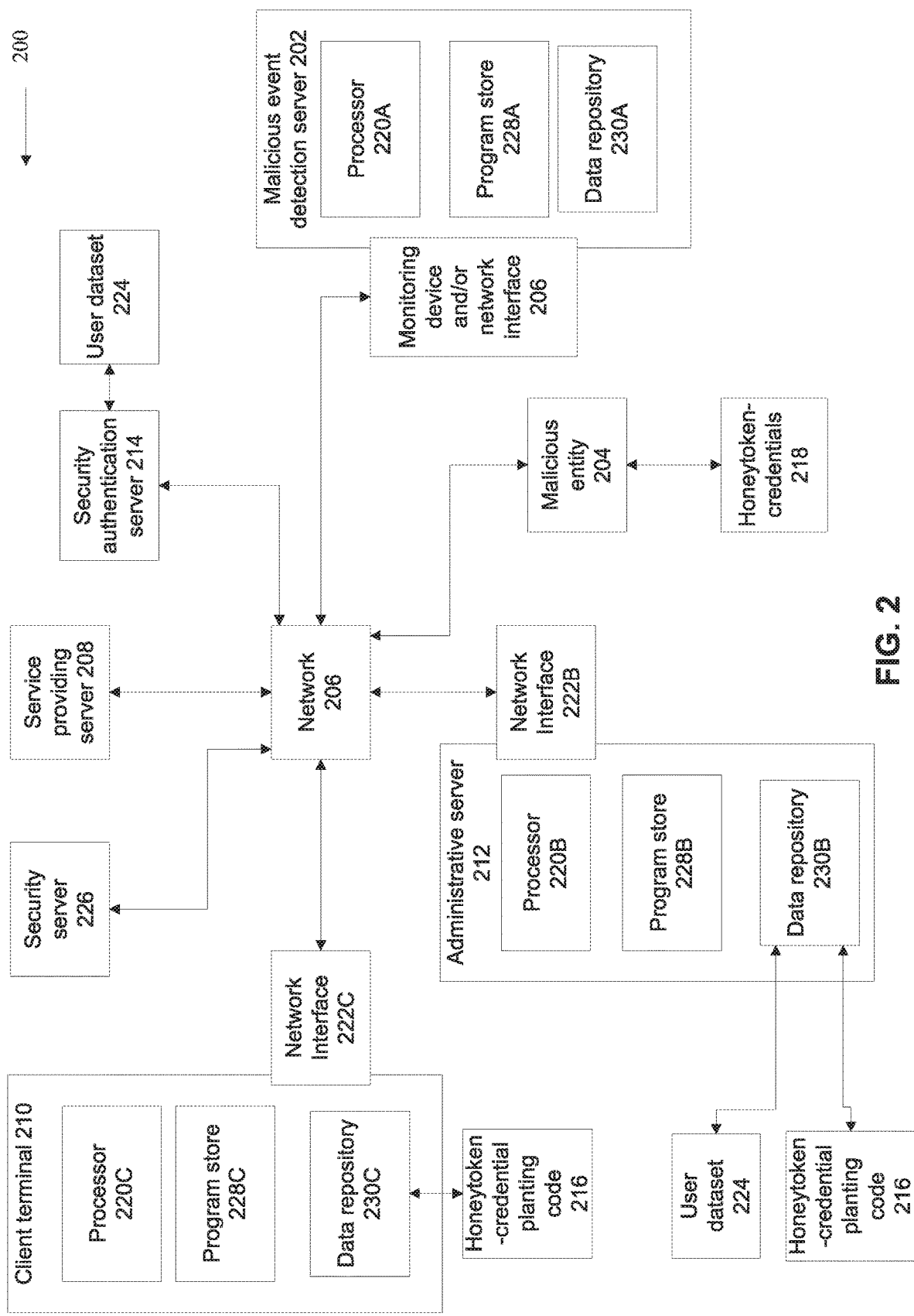
FIG. 2 is a block diagram of components of a system that detects a malicious attempt to access a service providing server using honeytoken-credentials stored in the memory of a client terminal of a valid user associated with the honeytoken-credentials, in accordance with some embodiments.

Reference is now made to FIG. 1, which is a flowchart of a method for detecting a malicious attempt to access a service providing server using stored honeytoken-credentials which are obtained in an unauthorized manner by a malicious entity from the memory of a client terminal of an authorized user associated with the honeytoken-credentials, in accordance with some embodiments. The method includes one or more acts for distributing honeytoken-credential storing code to client terminals that runs on the client terminal and stores the honeytoken-credentials in the memory of each respective client terminal. Reference is also made to FIG. 2, which is a block diagram of components of a system 200 that distributes honeytoken-credential storing code to client terminals to place honeytoken-credentials in respective local memories, and monitors network traffic to detect usage of the stored honeytoken-credentials when a failure to login to a remote service providing server is detected, in accordance with some embodiments. System 200 may implement the acts of the method of FIG. 1.

System 200 includes a malicious event detection server 202 that detects a malicious attempt by a malicious entity 204 using a network 206 to attempt to access a service providing server 208 using stored honeytoken-credentials 218 of a legitimate client terminal 210. A security authentication server 214 may authenticate the credentials of client terminals 210 to access service providing servers 208. An administrative server 212 that administers client terminals 210 within network 206 distributes honeytoken-credential storing code 216 to client terminal(s) 210 within network 206. Administrative server 212 and/or security authentication server 214 store a database of valid users and/or valid client terminals, optionally as user dataset 224. The honeytoken-credentials include an invalid login-credential(s) and a valid login-credential of a valid user and/or valid client terminal having an entry in user dataset 224. For example, a valid user-ID may be associated with an invalid honeytoken-password. It is noted that user dataset 224 may be implemented as one dataset storing usernames and other credentials, or more than one dataset, for example, one dataset storing usernames (e.g., stored in association with administrative server 212) and another dataset storing credentials such as passwords (e.g., stored in association with security authentication server 214).

Security authentication server 214 may include and/or be in communication with one or more sub-components and/or sub-servers, for example, based on the implementation of the computer network authentication protocol used to authentication credentials and allow access to the client terminal (and/or user) to the service providing server. For example, when security authentication server 214 implements the Kerberos protocol, security authentication server 214 may include or be in communication with a key distribution center (KDS), an authentication service (AS), and/or a ticket granting service (TGS).

Malicious event detection server 202, administrator server 212, and client terminal 210 may be each be implemented as a computing unit, in hardware and/or software, as a stand-alone unit and/or as software installed on an existing unit. Malicious event detection server 202 is programmed and/or positioned within network 206 to monitor and/or intercept network messages (e.g., packets) transmitted to and/or from security authentication server 214 and/or to and/or from service providing server 208. Malicious event detection server 202 is programmed and/or positioned to monitor and/or intercept failed login attempt related messages, which may be transmitted from security authentication server 214, and/or transmitted from service providing server 208.

Malicious event detection server 202, administrator server 212, and client terminal 210 each include a respective processor(s) 220A-C, for example, a central processing unit(s) (CPU), a graphics processing unit(s) (GPU), field programmable gate array(s) (FPGA), digital signal processor(s) (DSP), and application specific integrated circuit(s) (ASIC). Processor(s) 220A-C may include one or more processors (homogenous or heterogeneous), which may be arranged for parallel processing, as clusters and/or as one or more multi core processing units.

Optionally, a security server 226 is in communication with network 206. Security server 226 may store network security applications, which may be triggered and/or directed based on the indication of the detected malicious event crated by malicious event detection server 202. For example, security server 220 may execute a network security program to isolate malicious entity 204 when the failed login attempt uses the honeytoken-credential originating from malicious entity 204.

Malicious event detection server 202, administrator server 212, and client terminal 210 each include a respective network interface 222A-C for communicating with network 206, which may be a secured or unsecured network, for example, the internet, a private network, a cellular network, a wireless network, a local area network, or other networks. It is noted that network 206 may include one or more domains.

Network interface 222A of malicious event detection server 202 may include or be in communication with a network monitoring interface and/or unit that monitors network traffic, optionally packets, within network 206, for example, a packet sniffer, a packet analyzer, a network sensor, and/or network gateway.

Malicious event detection server 202, administrator server 212, and client terminal 210 each include a respective a program store 228A-C storing code implementable by respective processor(s) 220A-C, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Malicious event detection server 202, administrator server 212, and client terminal 210 each include a respective data repository 230A-C storing database(s), code, and/or other data items, for example, honeytoken-credential storing code 216, and user dataset 224, as described herein.

Malicious event detection server 202, administrator server 212, and client terminal 210 may each include and/or be in communication with a user interface that allows a user to enter data and/or view data, for example, a graphical user interface, a web server (allowing remote access and/or remote interface capabilities), a display, a screen, a mouse, a keyboard, and/or a touch screen.

Multiple client terminals 210, malicious event detection servers 202, security authentication servers 214, and administrator servers 212, may be implemented within network 206 (one of each component is shown for clarity), for example, organized in domains or other network architectures.

It is noted that two or more of: security authentication server 214, malicious event detection server 202, and administrative server 212 may be implemented within the same server, for example, using different application.

Optionally, security authentication server 214 is implemented using a MICROSOFT DOMAIN CONTROLLER. Optionally, administrative server 212 is implemented using a MICROSOFT ACTIVE DIRECTORY.

At 102, one or more honeytoken-credentials types are selected. Honeytoken-credentials of the selected type may be designated for each client terminal 210. The selection and/or designation may be performed automatically, optionally by processor 220B of administrative server 212 implementing code stored in program store 228B (e.g., selected and/or designated based on an algorithm), and/or manually by a user using a user interface, and/or by accessing a database storing predefined honeytoken-credentials.

The honeytoken-credential includes one or more valid login-credentials that may be easily accessed, such as by querying administrative server 212, and/or accessing user dataset 224. The valid login-credentials of the honeytoken-credentials may include publicly available credentials, and/or credentials accessible using a low security clearance. Examples of valid login-credentials selected for the honeytoken-credentials include: username, user-ID, or other account identification (e.g., of a client). As used herein, the term user account or username mean the user account, user-ID, client terminal account, client terminal-ID, and/or other user identification with which the valid login-credentials of the honeytoken-credential(s) are associated.

The honeytoken-credentials include one or more invalid login-credentials, which may be randomly generated, manually selected, and/or created using code instructions based on an algorithm. The invalid login-credentials may be obtained and/or based on previously valid login-credentials, which may be currently invalid, for example, currently expired old passwords of the user, and/or passwords that have been leaked, for example, a list of stolen and/or leaked passwords (which may be obtained from a server or from another source). The leaked passwords may have been detected and designated as being currently invalid. Use of the leaked passwords and/or old user passwords as the invalid login-credentials may allow for a quick sunset on the leaked passwords and/or helping to identify the entity that stole and/or leaked the passwords.

Optionally, the invalid login-credentials of the honeytoken-credential are designed to represent credentials that are difficult to access, and/or require a high level of authentication to access, for example, a password of a user. The invalid login-credential passwords may be created and/or designed based on the sophistication of valid password (e.g., used to access the service providing server), for example, based on a set-of-rules defined by the service providing server. For example, service providing servers having simple implementations and/or storing low-risk data and/or low-value data may use relatively simple passwords for access, for example, a server storing photos and/or music. The invalid login-credentials may be created based on the simplicity of commonly used passwords to access the site, for example, pas$word. In another example, the service providing server includes a sophisticated implementation and/or stores high-risk data and/or valuable data, for example, a bank storing corporate bank accounts. Valid passwords to access the bank accounts may require conformation to a set-of-rules, for example, a minimum length, a minimum combination of lower case letters, upper case letters, symbols, and/or numbers, and may require a minimum calculated complexity. The invalid passwords may be created to conform to the set-of-rules, for example, the password, AWER1!_kjafsda###$%.

Optionally, fake service providing servers may be accessed by an entity using the set of honeytoken-credentials, including the invalid user password. The fake server may mimic a real server, and allow access to an entity using invalid credentials (e.g., which cannot be used to access the real service providing server). The fake server may help catch the malicious entity accessing the fake server, for example, by using the time that the entity is looking around the fake server to identify the entity. The sophistication of the invalid passwords may be designed according to the fake services hosted by the fake service providing server, for example, a simple invalid password when the fake server includes unsophisticated implementation (e.g., storing photos, and/or music), and a sophisticated invalid password may be used when the fake service providing server stores a sophisticated service (e.g., bank accounts).

As used herein, the term honeytoken-password or honeytoken-credential may refer to an invalid login-credential presented as a password or other secret credential of the user.

Alternatively or additionally, the honeytoken-credentials are designed to represent login-credentials that are created by the client terminal (which may not necessarily be stored by administrative server 212), optionally, passwords, hashes, and/or other keys used in an authentication process with security authentication server 214. For example, a password used to encrypt a timestamp in the AS-REQ network message used by the Kerberos protocol, and/or a hash of the user's password used to encrypt a challenge received as part of the NT LAN (NTLM) protocol.

The invalid login-credentials associated with the user account are different than the actual corresponding login-credentials of the user account (e.g., which may be stored in user dataset 224, in association with administrative server 212 and/or security authentication server 214).

The invalid login-credential may include an empty login-credential. The empty invalid login-credential may be selected, for example, for use in processes in which the valid password is emptied, for example, after the Kerberos SSP calculated keys from the password. Reference is now made to FIG. 3, which is a screen capture of a memory dump showing an empty password stored as the invalid login-credential of the honeytoken-credentials (Password: <null>), in accordance with some embodiments.

Referring now back to FIG. 1, the invalid login-credential of the honeytoken-credential is invalid for authentication of client terminal 210 to access service providing server 208, optionally in a network environment in which security authentication server 214 performs the authentication based on a computer network authentication implementation, for example, Kerberos, NTLM, Lightweight Directory Access Protocol (LDAP), and/or other authentication protocols. Malicious entities that obtain the invalid login-credentials and/or honeytoken-credentials and attempt to use them to access service providing server 208 are denied access (i.e., since the invalid login-credential of the honeytoken-credential is not a valid login-credential), which may provide another layer of security.

The valid login-credential, such as a username (i.e. the real username of a real user) may exist as an entry in a security administration database (e.g., user dataset 224) of security authentication server 212. The valid login-credential may be stored in the security administration database (e.g., user dataset 224) in association with a valid login-credential that is different than the invalid login-credential of the honeytoken-credentials. For example, the valid username login-credential is stored in association with a valid user password (i.e., the real password that the user uses). The invalid honeytoken-password designed for the valid username is different than the valid user password.

The same honeytoken-credentials may be used for multiple client terminals, for example, in an environment in which it is difficult to change parameters for each client terminal. When the same honeytoken-credentials are used, the honeytoken-credentials may be delivered to the client terminal using a wrapping script and/or in binary form to hide the actual honeytoken-credentials from identification by malicious entities. Alternatively, different honeytoken-credentials may be used for each client terminal.

At 104, a network message(s) (e.g., packets) including honeytoken-credential storing code 216 that includes instructions to store the selected and/or designated honeytoken-credentials is transmitted from administrative server 212 to one or more client terminals 210 over network 206, optionally to all (or selected) client terminals 210 being administered by administrative server 212 (e.g., based on the user accounts stored in user dataset 224).

Optionally, the honeytoken-credential storing code 216 includes wrapping code in the transmitted network message. The wrapping code may include a script and/or binary encoding. The wrapping code is designed to make it difficult for malicious entities to identify the honeytoken-credentials, for example, when the honeytoken-credentials are transmitted to client terminals using a command in a group policy (which may be observable to the malicious entity), or for example, when the same honeytoken-credentials are used for different client terminals.

Honeytoken-credential storing code 216 is designed to be stored (e.g., in program store 228C) and implemented by processor 220C of each respective client terminal 210.

Figure 4:
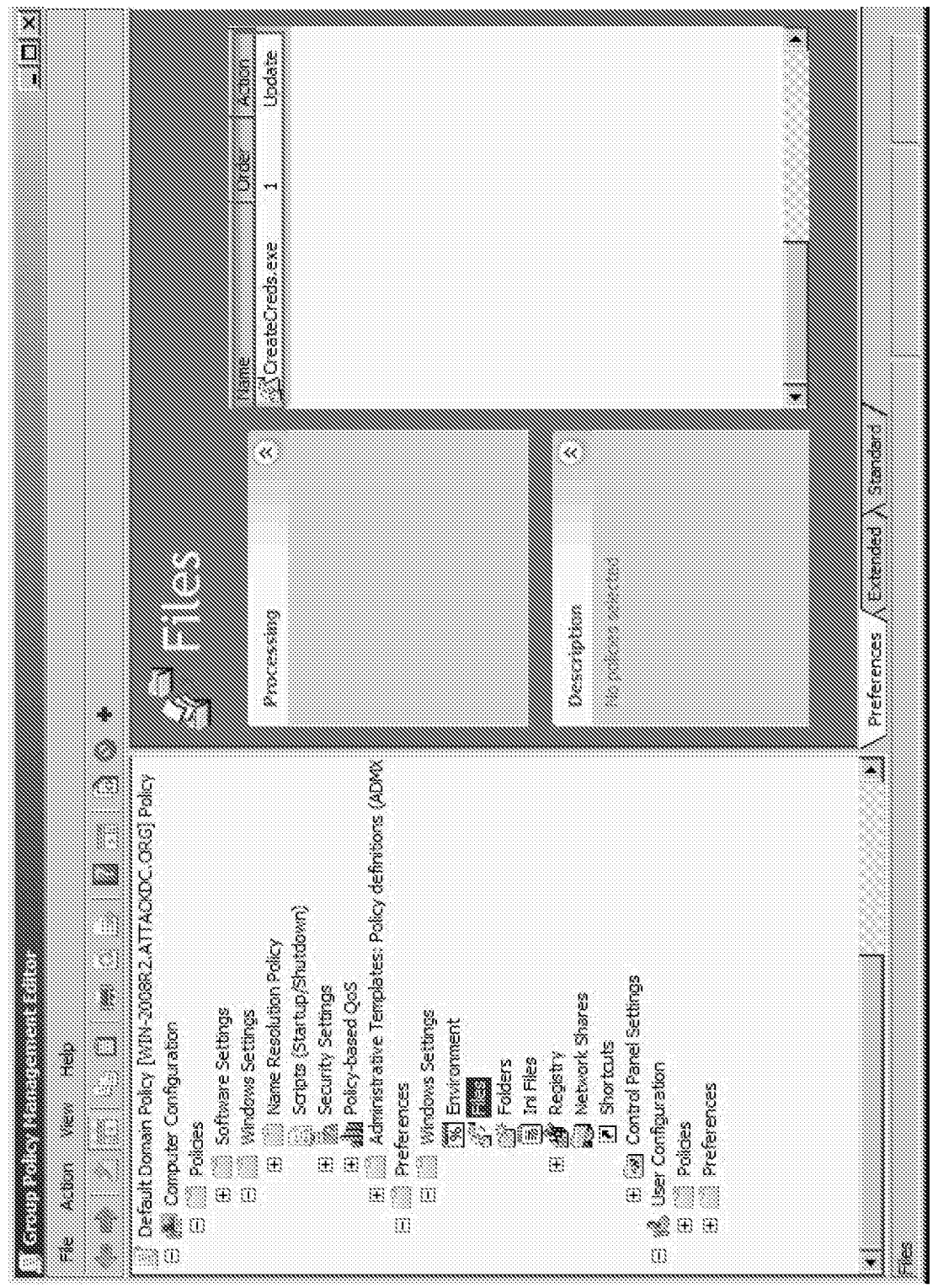
FIG. 4 is a screen capture showing distribution of honeytoken-credential storing code using Group Policy Management Editor, in accordance with some embodiments.

The network message including honeytoken-credential storing code 216 may be transmitted from administrative server 212 to client terminals 210 using MICROSOFT GROUP POLICY. Reference is now made to FIG. 4, which is a screen capture showing distribution of honeytoken-credential storing code 216 (termed CreateCreds.exe) using Group Policy Management Editor, in accordance with some embodiments.

Referring now back to FIG. 1, other exemplary methods of deploying honeytoken-credential storing code 216 on client terminals 210 include using a Systems Management Server (SMS), for example a Systems Center Configuration Manager (SCCM), to distribute code 216 across network 206. Another method is by directly accessing each client terminal 210 using a highly privileged account that may execute on the client terminals, for example, using Windows Management Instrumentation (WMI) or Remote Shell.

At 106, the honeytoken-credentials are stored in client terminal 210. Honeytoken-credential storing code 216 is executed by processor 220C of each respective client terminal 210, which includes instructions to store the selected and/or designated honeytoken-credentials in a memory of the respective client terminal 210.

Honeytoken-credential storing code 216 includes instructions to store the both the invalid login-credential and the valid login-credential within the local memory of the respective client terminal. The invalid login-credential is stored in a location in the local memory designed to store the corresponding valid version of the invalid login-credentials. The honeytoken-credentials may be accessed by a malicious entity, for example, performing a memory dump of the local memory of the client terminal, and analyzing the memory dump to identify one or more fields designated for storing login-credentials.

Figure 5:
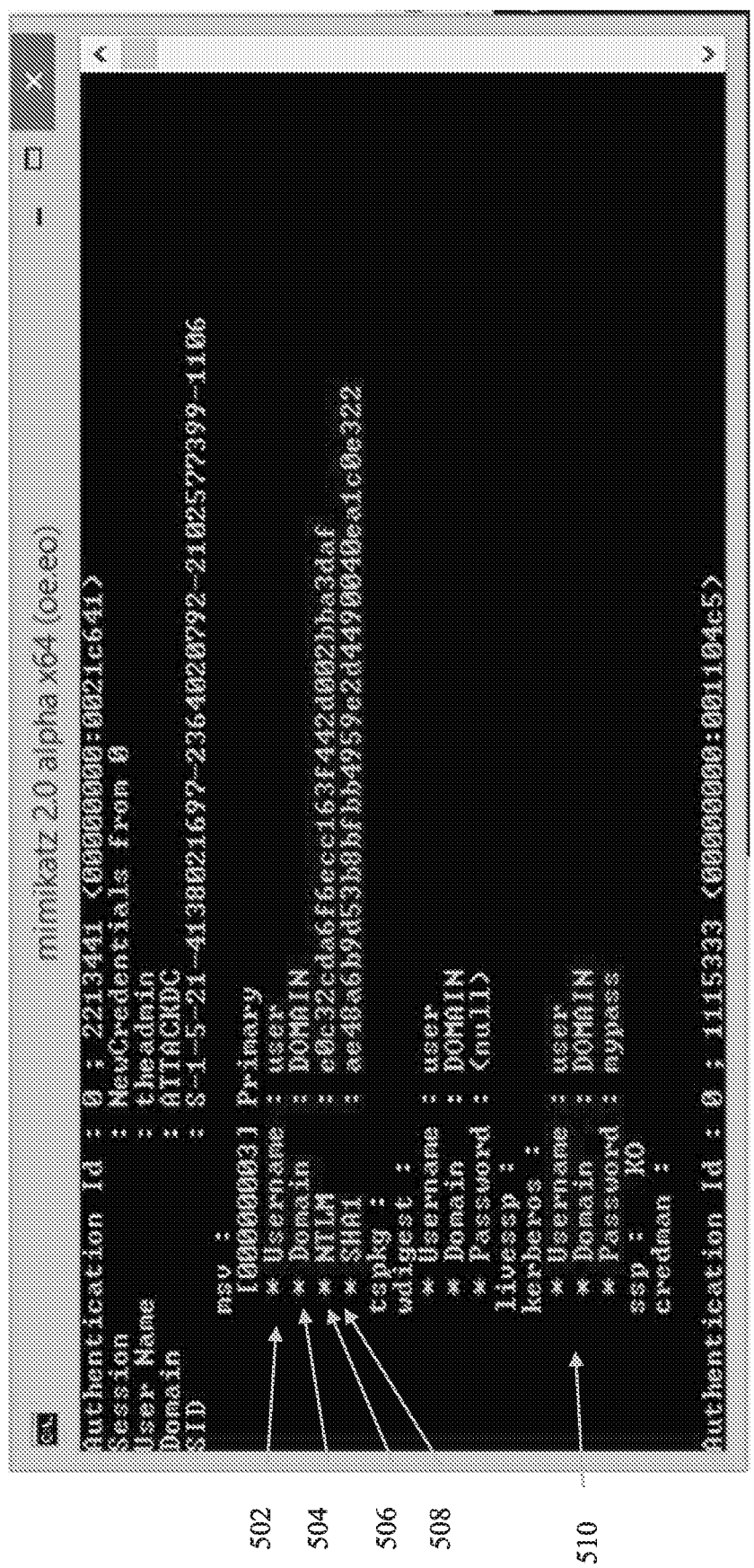
FIG. 5 is a screen capture of a memory dump showing honeytoken-credentials that include valid login-credentials in accordance with some embodiments.

Reference is made to FIG. 5, which is a screen capture of a memory dump showing valid login-credentials (Username field 502) and one or more invalid login-credentials (Domain 504, NTLM 506, SHA1) in accordance with some embodiments. Valid login-credentials and invalid login-credentials are stored for remote access authentication provided using the Kerberos protocol 508.

Figure 6:
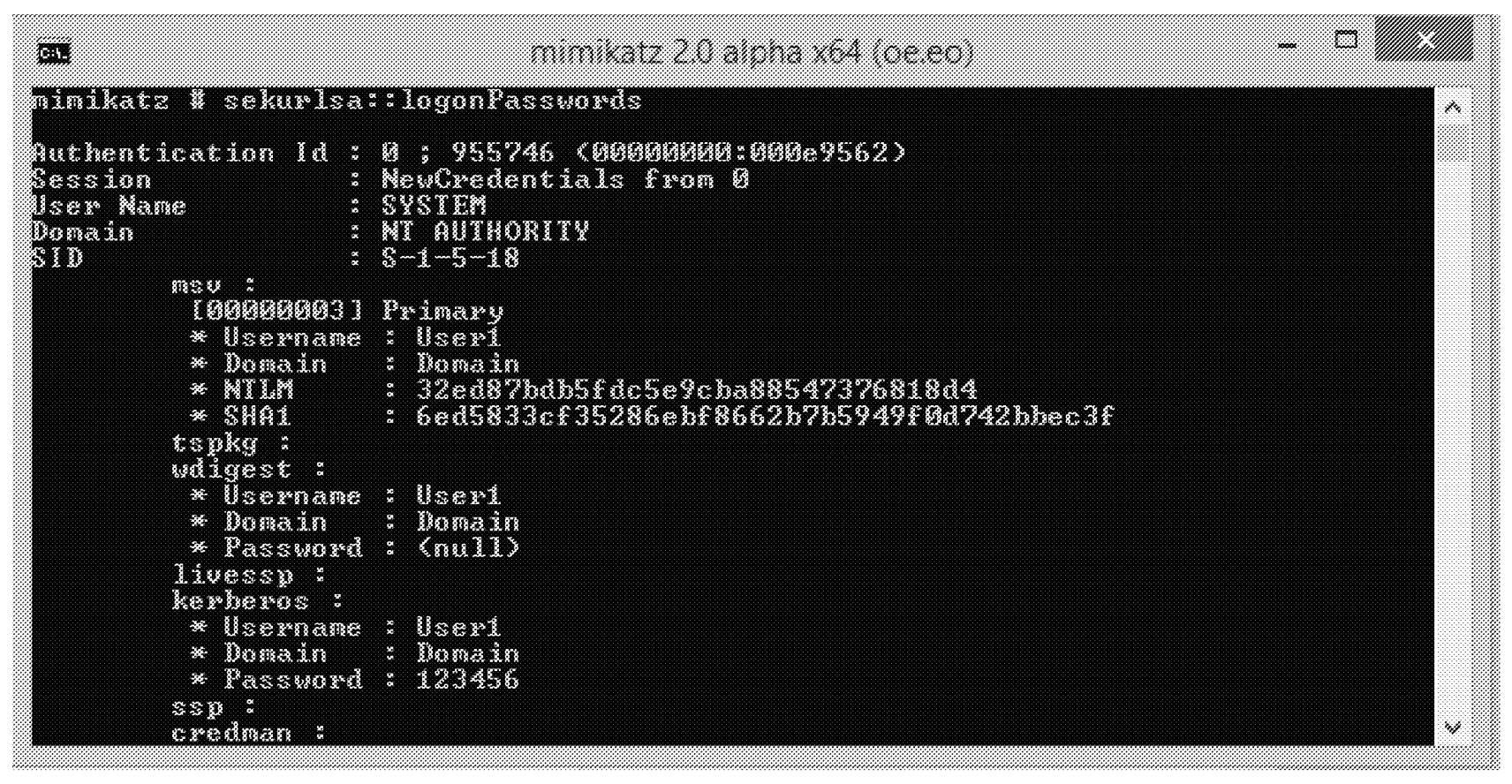

Reference is now made to FIG. 6, which is another screen capture of a memory dump showing valid login-credentials and invalid login-credentials, in accordance with some embodiments.

Figure 7:
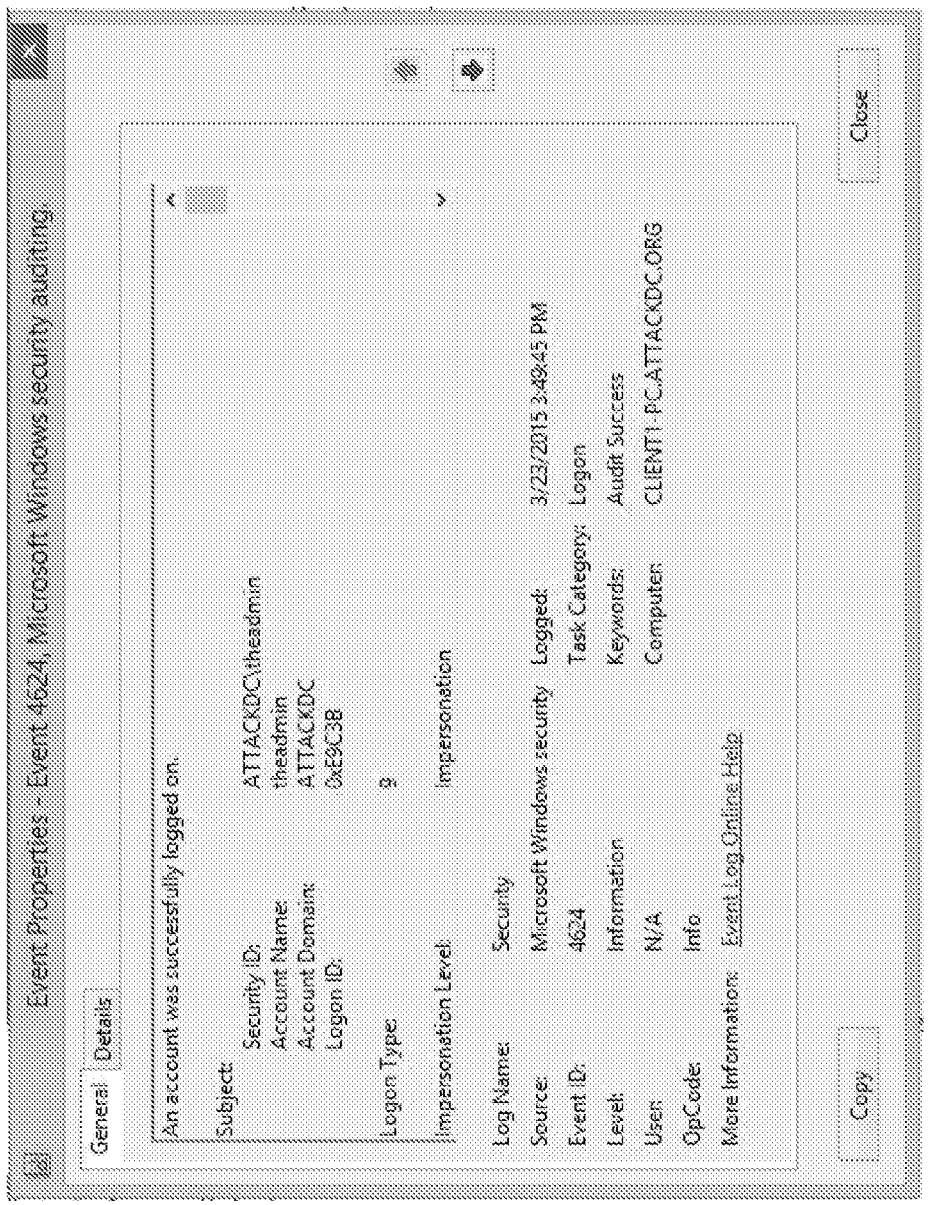
FIG. 7 is a screen capture showing a Log on impersonation event created by the honeytoken-credential storing code, in accordance with some embodiments.
Figure 8:
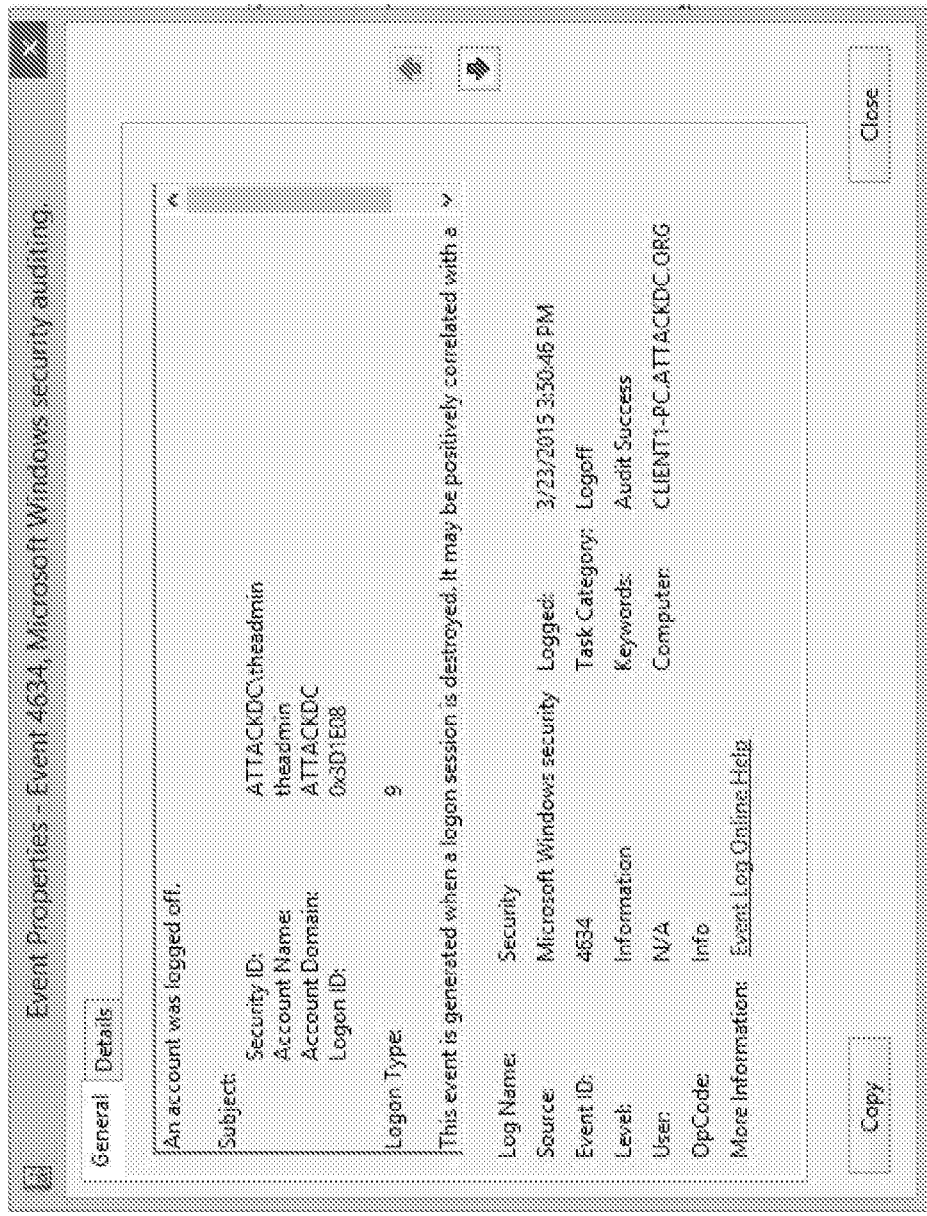
FIG. 8 is a screen capture showing a Log off impersonation event created by the honeytoken-credential storing code, in accordance with some embodiments.

Referring now back to FIG. 1, optionally, the honeytoken-credentials are stored in the memory by code that initiates an impersonated logon (e.g., remote login) to a remote server using the honeytoken-credentials. Initiation of the logon process stores the honeytoken-credentials used in the logon process in the memory of the client terminal. Reference is now made to FIG. 7, which is a screen capture showing a Log on impersonation event created by the honeytoken-credential storing code 216, in accordance with some embodiments. Reference is also made to FIG. 8, which is a screen capture showing a Log off impersonation event created by the honeytoken-credential storing code 216, in accordance with some embodiments.

Referring now back to FIG. 1, optionally, the honeytoken-credentials are stored as unencrypted plaintext. The plaintext may be retrieved by a memory dump. It is noted that valid login-credentials may be stored in memory as unencrypted plaintext as part of a valid logon process.

Optionally, the invalid login-credential is stored in a field defined by a computer network authentication protocol (e.g., Kerberos, NTLM, LDAP) used by client terminal 210 for authentication to service providing server 208 by security authentication server 214 implementing the computer network authentication protocol. For example, a field storing data used to encrypt the encrypted timestamp in the AS-REQ of the Kerberos protocols, a hash of the user's password used to encrypt the challenge received from security authentication server 214 implementing NTLM, and a password field based on the LDAP protocol.

Optionally, honeytoken-credential storing code 216 includes instructions to store the honeytoken-credentials on the local memory of client terminal 210 during each re-boot of client terminal 210. In this manner, every time client terminal 210 is turned on or re-booted, the honeytoken-credentials are re-stored in memory.

Optionally, honeytoken-credential storing code 216 includes instructions to store the honeytoken-credentials in the local memory until reboot or shutdown. In this manner, the honeytoken-credentials remain in the memory as long as client terminal is on and/or active.

Optionally, the network message includes instructions to execute honeytoken-credential storing code 216 upon receipt, and/or as a start-up script executed during a boot-up. In this manner, the honeytoken-credentials are stored in the memory when the code is received, and/or during the next boot-up of the client terminal.

Optionally, honeytoken-credential storing code 216 is executed as a background process. The background execution maintains the honeytoken-credentials in the memory of the client terminal.

Figure 9:
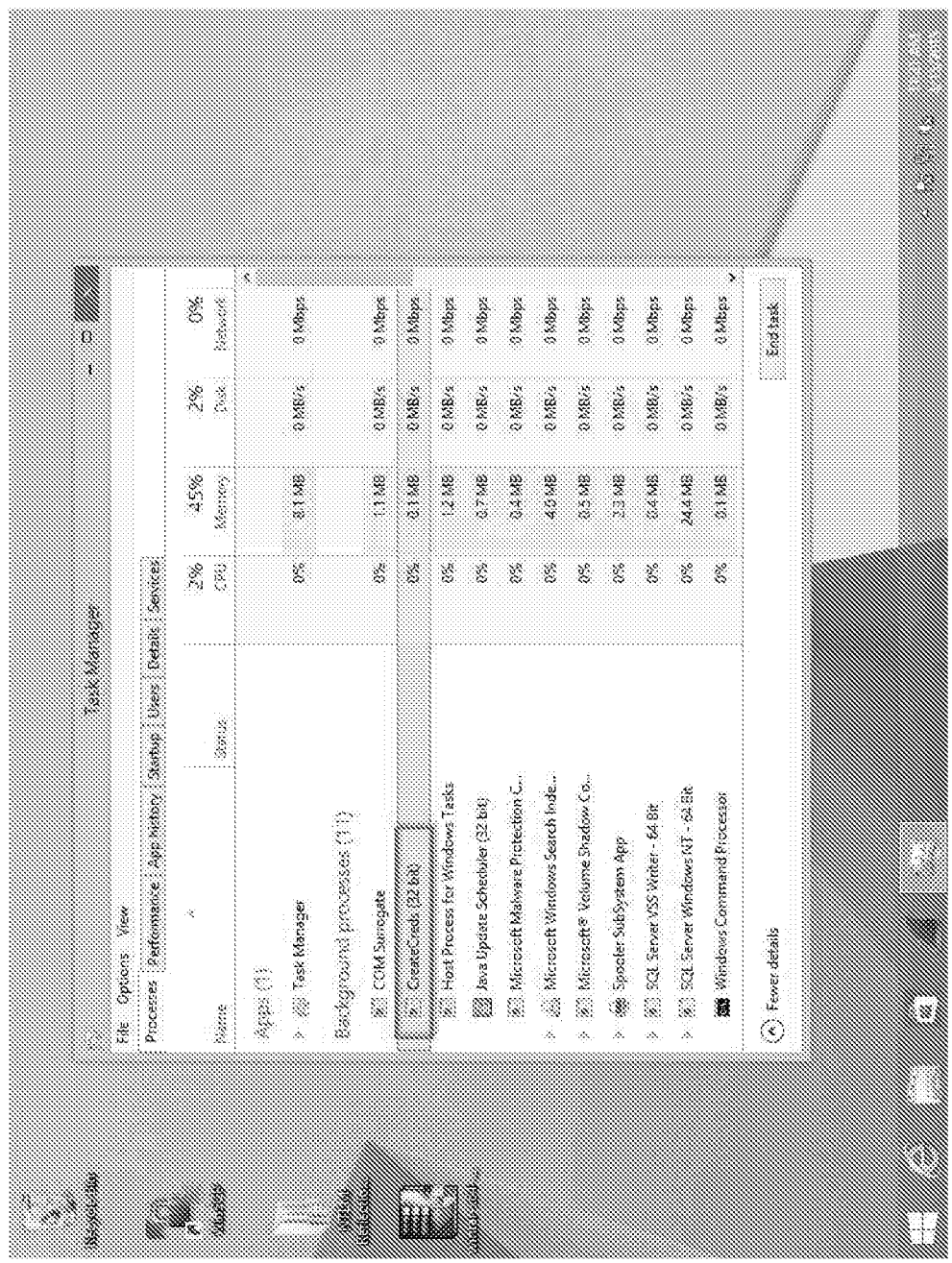
FIG. 9 is a screen capture depicting execution of honeytoken-credential storing code as a background process on client terminal, in accordance with some embodiments.

Reference is now made to FIG. 9, which is a screen capture depicting execution of honeytoken-credential storing code 216 as a background process on client terminal 210, in accordance with some embodiments.

Referring now back to FIG. 1, optionally, the instructions of the honeytoken-credential storing code 216 are designed to remain contained within the client terminal during execution, without generating network messages transmitted over the network. In this manner, implementation of honeytoken-credential storing code 216 on multiple client terminals 210 of network 206 does not necessarily result in a significant amount of increased network traffic.

Figure 10:
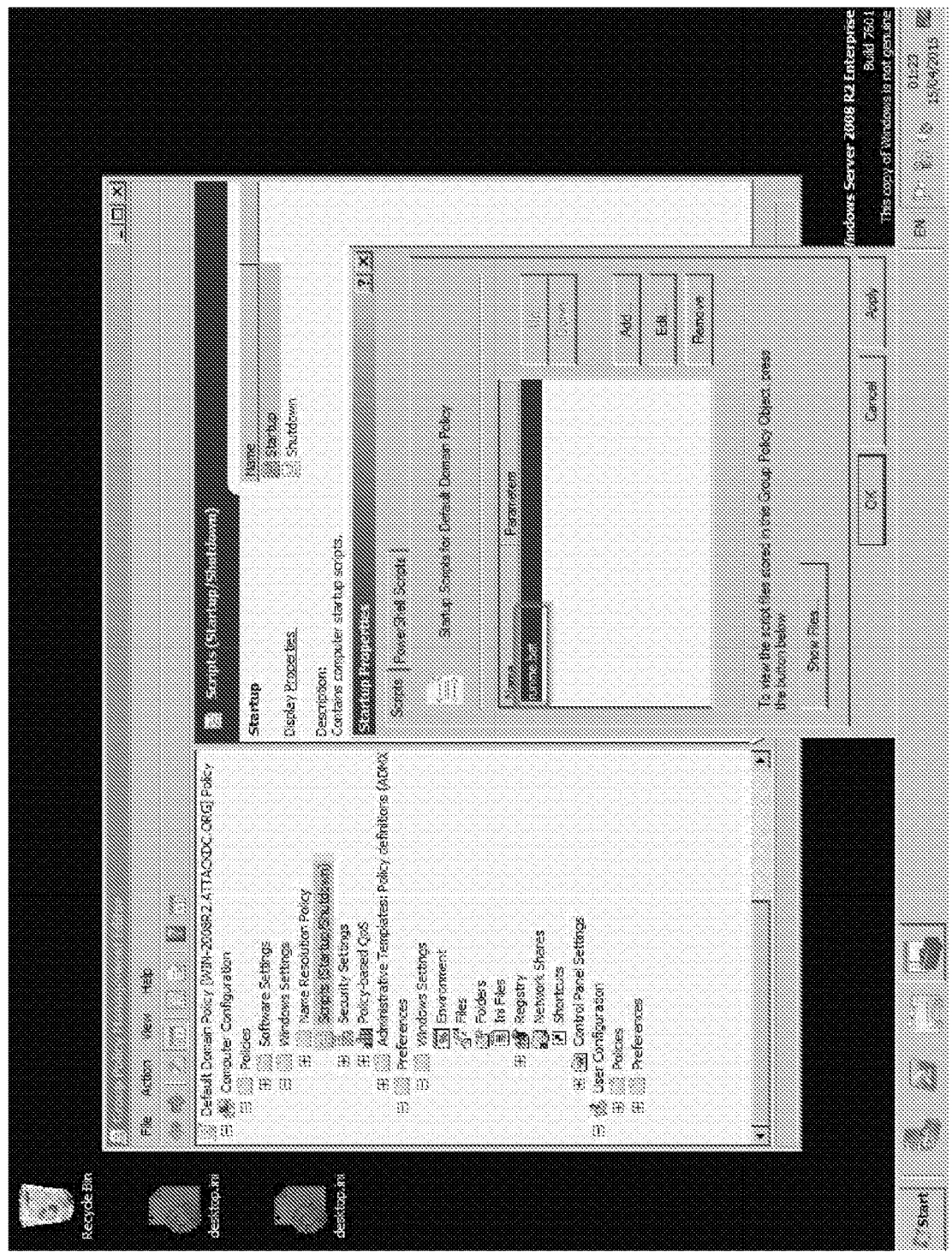
FIG. 10 is a screen capturing showing distribution of a Startup Script to client terminals, in accordance with some embodiments.
Figure 11:
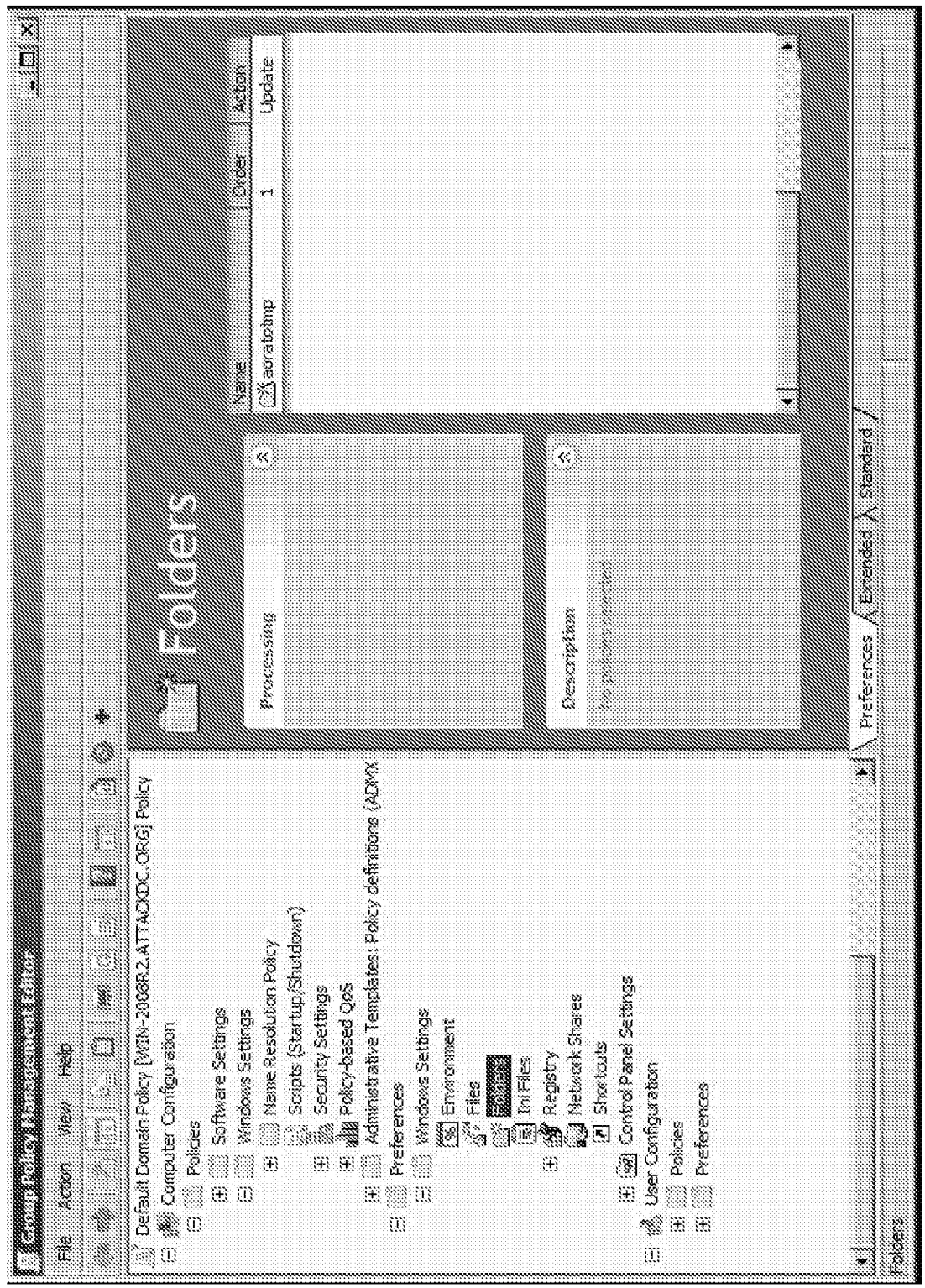
FIG. 11 is a screen capture showing creating of a folder on the client terminals using Group Policy, in accordance with some embodiments.

Optionally, honeytoken-credential storing code 216 is an executable file. Optionally, the executable file is executed once per a computer boot. The executable file may be executed by a Startup script. The startup script may be distributed to the client terminals 210, for example, using Group Policy. Reference is now made to FIG. 10, which is a screen capturing showing distribution of the Startup Script to client terminals 210 using Group Policy, in accordance with some embodiments. Reference is now made to FIG. 11, which is a screen capture showing creation of a folder on the client terminals using Group Policy, in accordance with some embodiments. The folder (added to the path c:\aoratotmp) prevents client terminals from locking the file on the Domain Controller (which prevents updates to the file). The Startup script runs honeytoken-credential storing code 216 from the local path that was created.

Figure 12:
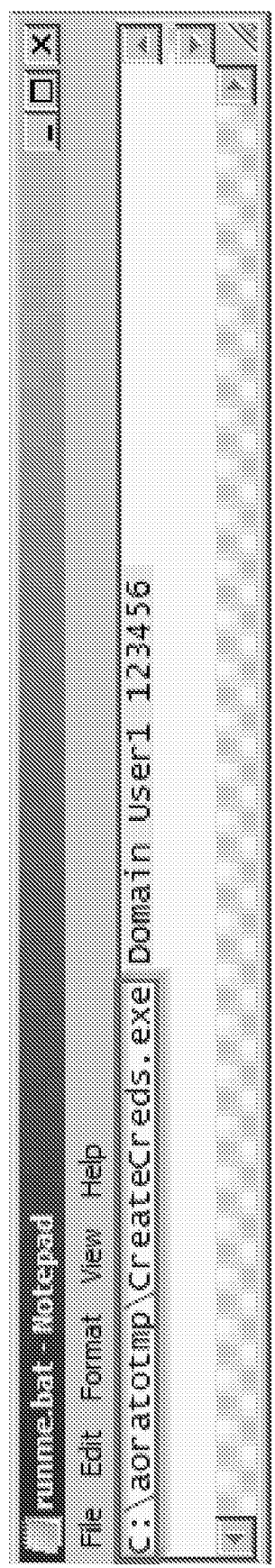
FIG. 12 is a screen capture showing contents of a batch file that executes to store the valid login-credential and invalid login-credential of the honeytoken-credentials in the memory of the client terminal, in accordance with some embodiments.

Referring now back to FIG. 1, optionally, honeytoken-credential storing code 216 runs a process with impersonation using the valid login-credential (e.g., username) and the invalid login-credential of the honeytoken-credentials. An exemplary implementation of code 216 receives a Domain, User (i.e., valid login-credential), and Password (i.e., invalid login-credential) as parameters, initiates an impersonated logon process using the parameters, which adds the parameters to the memory, and runs in the background (to maintain the parameters in memory). Reference is now made to FIG. 12, which is a screen capture showing contents of a batch file (RunMe.bat) that executes the executable implementation of honeytoken-credential storing code 216 (CreateCreds.exe) from the local folder of the client terminal, using a domain (which may be valid or invalid), a valid login-credential (e.g., username), and an invalid login-credential (e.g., invalid honeytoken-password), to store the valid and invalid login-credentials of the honeytoken-credentials in the memory of the client terminal, in accordance with some embodiments.

Referring now back to FIG. 1, alternatively or additionally, in a MICROSOFT WINDOWS operation system environment, a Local Security Authority Subsystem Service (LSASS) memory manipulation application implementation of honeytoken-credential storing code 216 may be used to create a memory picture including the honeytoken-credentials.

Alternatively or additionally, honeytoken-credential storing code 216 may store a honeytoken-ticket, for example, a honeytoken-Kerberos ticket, such as by using an interface that does not necessarily require administrator privileges, for example, the application programming interface (API) provided by LsaCallAuthenticationPackage.

At 108, traffic over network 206 is monitored to detect a login-failure event. Packets may be monitored and/or intercepted. The monitoring may be performed by a network monitoring device (e.g., monitoring interface 222A) in communication with malicious event detection server 202.

Monitoring interface 222A may be installed within network 206 to monitor packets transmitted to and/or from security authentication server 214, to and/or from service providing server 208, and/or to and/or from client terminal(s) 210. For example, monitoring interface 222A is designed to monitoring packets transmitted to and/or from a key distribution center (KDC) in a Kerberos implementation of a computer network authentication protocol used to authenticate clients to service providing servers.

The packets may include login-credentials (optionally the honeytoken-credentials) of client terminal 210 requesting authorization to access service providing server 208.

At 110, an attempt to obtain authentication by a client terminal (e.g., malicious entity) to access a service providing server may be detected. Optionally, a login-failure event is identified, optionally by processor 220A of malicious event detection server 202 implementing code stored in program store 228A. The login-failure event represents a failure by client terminal 210 (which may be impersonated by malicious entity 204) to remotely login over network 206 to service providing server 208.

The login-failure event may be identified based on an analysis (by malicious event detection server 202) of data extracted from the monitored and/or intercepted packet(s). For example, the login-failure may be identified by a login-failure message transmitted from service providing server 208 and/or from security authentication server 214 indicating that the login process failed (e.g., due to incorrect credentials). For example, the network message(s) associated with the login-failure-event include a rejection by LDAP server and/or Kerberos server to authenticate the client terminal (i.e., malicious entity 204 using the credentials of the client terminal).

The login-failure message may be transmitted to malicious entity 204, which is using the honeytoken-credentials obtained from client terminal 210.

Alternatively or additionally, an expected login-failure is identified based on the content of the monitored and/or intercepted network traffic, which may originate from malicious entity 204 (which may disguise itself as client terminal 210). The expected login-failure event may be identified by detecting the honeytoken-credentials within network messages related to an attempt to access service providing server 208, and/or within network messages related to a request to authenticate with security authentication server 214. In such a case, since the combination of valid login-credentials and invalid-login credentials (stored as the honeytoken-credentials) is invalid, a login-failure event is expected to be generated by server 208 and/or server 214. The network packets may be intercepted prior to the generation of the login-failure by server 208 and/or server 214.

At 112, one or more login-credentials associated with the attempt to obtain authentication to access the service providing server are received. Optionally, login-failure-credentials associated with the identified login-failure event are received by malicious event detection server 202, for example, by code that extracts login-credentials from fields of network message(s) associated with the login-failure event.

Optionally, the login-failure-credentials are extracted from packet(s) associated with the login-failure event by plaintext extraction from a field defined for storing the login-credentials.

At 114, the received login-credentials (e.g., login-failure-credential(s)) are analyzed (optionally by malicious event detection server 202) to determine whether the login-failure-credential match honeytoken-credentials.

Identifying a match between the received login-credential (e.g., login-failure-credential extracted from network traffic) and one or more honeytoken-credentials (e.g., which may be stored in data repository 230A of malicious event detection server 202, and/or remotely obtained from security authentication server 214, administrative server 212, and/or another data storage server) is indicative that the login-failure-credentials was obtained in an unauthorized manner from the memory of client terminal 210 (which was stored in the memory by honeytoken-credential storing code 216, as described herein).

Optionally, a login-failure-username (or other login-credential) associated with the identified login-failure event is extracted from the network message. The login-failure-username (or other login-credential) is analyzed to determine whether the login-failure-username matches a valid login-credential, optionally having an entry in user dataset 224. A successful match indicates that the login-failure-username has been obtained from the memory of client terminal 210 in an unauthorized manner by malicious entity 204.

A certain client terminal may be identified as associated with the matched valid login-credential. The honeytoken-credentials designated to the certain client terminal may be identified, for example, using user dataset 224, and/or another dataset mapping usernames (or other valid login-credentials) and the client terminals on which honeytoken-credentials that include the valid login-credentials were stored.

Matching the honeytoken-credentials stored on the certain client terminal to the login-failure-credentials is indicative that honeytoken-credentials were obtained from the memory of the certain client terminal in an unauthorized manner.

A relatively simple match may be identified when the extracted login-failure-credentials are stored as unencrypted plaintext in the packets. In some cases, additional processing to obtain the login-failure-credential may be required. Some exemplary scenarios are now described:

The login-failure-event includes a rejection by a Kerberos server (e.g., security authentication server 214 implementing the Kerberos protocol) to authenticate an AS-REQ transmitted by malicious entity 204 using credentials obtained from client terminal 204. The extracted login-failure-credential includes a password used to encrypt a timestamp in the AS-REQ. In such a case, the honeytoken-credential stored on client terminal 204 includes an invalid login-credential in the form of a honeytoken-password. Malicious event detection server 202 checks whether the stored honeytoken-password matches the password used to encrypt the timestamp, by decrypting the encrypted timestamp in the AS-REQ using the honeytoken-password. The malicious event is identified when the honeytoken-password successfully decrypts the timestamp, indicating that the timestamp was encrypted using the honeytoken-password, which was obtained in an unauthorized manner by malicious entity 204 from client terminal 210.

The login-failure-event includes a rejection by an NTLM server (e.g., server 214) to authenticate a response to a challenge transmitted by malicious entity 204 using credentials obtained from client terminal 204. The extracted login-failure-credential includes a hash of the user's password used to encrypt the challenge transmitted from the NTLM server. In such a case, the honeytoken-credentials stored on client terminal 204 include an invalid login-credential in the form of a honeytoken-hash of the user's password. Malicious event detection server 202 computes a response to the challenge by encrypting the challenge using the honeytoken-hash. The malicious event is detected when the challenge encrypted using the honeytoken-hash matches the challenge transmitted by malicious entity 204 (representing itself as client terminal 210) encrypted using the hash of the user's password associated with the login-failure-event, indicating that the honeytoken-hash was obtained in an unauthorized manner from the memory of client terminal 210.

At 116, the malicious event is identified by the malicious event detection server 202 when the login-failure-credential matches one or more of the stored honeytoken-credentials. The malicious event may be identified when some login-failure-credentials (e.g., login-failure-username) match a valid login-credential of the stored honeytoken-credential. The malicious event may be identified based on identifying that the matched honeytoken-credentials are stored on the same certain client terminal associated with the matched valid login-credential.

At 118, an indication of the malicious event is outputted by malicious detection server 202. The indication may include, for example, transmission of a message for display on a screen of a computing device of an administrator, which may alert the network administrator that further investigation is required. The indication may be transmitted to another server, for example, to security server 226, which may initiate manual and/or automatic security processes, for example, isolation of malicious entity 204 and/or client 210. The indication may be stored in an event log (on a local and/or remote storage device).

It is expected that during the life of a patent maturing from this application many relevant administrative servers, service providing servers, security authentication servers, client terminals, and honeytoken-credentials will be developed and the scope of the terms administrative servers, service providing servers, security authentication servers, client terminals, and honeytoken-credentials are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments may be presented in a range format. It should be understood that the description in range format is merely for convenience and brevity and should not be construed as an inflexible limitation on the scope. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

According to an aspect of some embodiments there is provided a computer-implemented method for detecting a malicious attempt to obtain authentication to access a service providing server using credentials of a client terminal in a network, the method performed by a malicious event detection server analyzing packets transmitted over the network, the method comprising: receiving at least one login-credential associated with an attempt to obtain authentication to access the service providing server; analyzing the at least one login-credential to determine whether the received login-credential matches an invalid login-credential included in a set of honeytoken-credentials, wherein the set of honeytoken-credentials is stored on a local memory of the client terminal, wherein the set of honeytoken-credentials includes the invalid login-credential and a valid login-credential, wherein the invalid login-credential is invalid for authentication of the client terminal to access the service providing server and the valid login-credential is valid for authentication of the client terminal to access the service providing server; identifying a malicious event when the received login-credential matches the invalid login-credential of the set of honeytoken-credentials; and outputting an indication of the malicious event.

Optionally, the received login-credential comprises a password, the honeytoken-credentials comprises an invalid honeytoken-password as the invalid login-credential, and a valid username as the valid login-credential.

Optionally, the method further comprises receiving a second login-credential associated with the attempt to obtain authentication to access the service providing server; analyzing the second login-credential to determine whether the received second login-credential matches the valid login-credential stored in the local memory of the client terminal in association with the stored set of honeytoken-credentials; and wherein identifying further comprises identifying the malicious event when the second login-credential matches the valid login-credential.

Optionally, the method further comprises identifying a login-failure event based on an analysis of at least one transmitted packet, wherein the login-failure event represents a failure by the client terminal to obtain authorization to access to remotely login over the network to the service providing server; and wherein the login-credential is associated with the identified login-failure event.

Optionally, the attempt to obtain authentication to access the service providing server comprises a rejection by a Kerberos server to authenticate an AS-REQ transmitted by the client terminal; the received login-credential comprises a password used to encrypt a timestamp in the AS-REQ; the set of honeytoken-credentials comprises a honeytoken-password as an invalid login-credential; and the method further comprises: decrypting an encrypted timestamp in the AS-REQ using the honeytoken-password; and identifying the malicious event when the honeytoken-password successfully decrypts the timestamp indicating that the timestamp was encrypted using the password which matches the honeytoken-password.

Optionally, the attempt to obtain authentication to access the service providing server comprises a rejection by an NT LAN Manager (NTLM) server to authenticate a response to a challenge transmitted by the client terminal; the received login-credential comprises a hash of the user's password used to encrypt the challenge received from the NTLM server; the invalid login-credential of the set of honeytoken-credentials comprises a honeytoken-hash of the user's password; and the method further comprises: computing a response to the challenge by encrypting the challenge using the honeytoken-hash; and identifying the malicious event when the challenge encrypted using the honeytoken-hash matches the challenge transmitted by the client terminal encrypted using the hash of the user's password.

Optionally, the method further comprises extracting the login-credential from at least one network traffic packet associated with the attempt to obtain authentication to access the service providing server by plaintext extraction from a field defined for storing the login-credential. Optionally, the attempt to obtain authentication to access the service providing server comprises a rejection by a Lightweight Directory Access Protocol (LDAP) server to authenticate the client terminal.

According to an aspect of some embodiments there is provided a computer-implemented method for distributing a set of honeytoken-credentials to at least one client for detection of a malicious attempt to access a service providing server using login-credentials of the at least one client in a network, the method performed by an administrative server that administers the at least one client in the network, the method comprising: transmitting a network message including honeytoken-credential storing code from the administrative server to each of the at least one client terminal for implementation by a processor of each client terminal to store the set of honeytoken-credentials on a local memory of the respective client terminal, the set of honeytoken credentials including at least one valid login-credential, and at least one invalid login-credential, the invalid login-credential being invalid for authentication of the client terminal to obtain access to the service providing server, the valid login-credential being valid for authentication of the client terminal to obtain access to the service providing server.

Optionally, the honeytoken-credential storing code comprises instructions to initiate an impersonated logon process to a remote server using the stored set of honeytoken-credentials, and code to store the set of honeytoken-credentials in the local memory of the client terminal.

Optionally, the set of honeytoken-credentials is stored as unencrypted plaintext retrievable by a memory dump of the local memory.

Optionally, the set of honeytoken-credentials comprises an empty credential.

Optionally, the method further comprises wrapping code in the transmitted network message in at least one of a script and binary encoding.

Optionally, at least one of member of the set of honeytoken-credentials is stored in a field defined by a computer network authentication protocol used by the client terminal for authentication to the service providing server by a security authentication server implementing the computer network authentication protocol.

Optionally, the instructions of the honeytoken-credential storing code when executed are contained within the client terminal without generating network messages transmitted over the network.

Optionally, the network messages include instructions to execute the honeytoken-credential storing code to store the set of honeytoken-credentials on the local memory during each re-boot of the client terminal.

Optionally, the honeytoken-credential storing code stores the set of honeytoken-credentials in the local memory of the client terminal until reboot or shutdown.

Optionally, the network messages include instructions to execute the honeytoken-credential storing code as a start-up script executed during a boot-up.

Optionally, the honeytoken-credential storing code is executed as a background process at the client terminal to maintain the set of honeytoken-credentials in the local memory of the client terminal.

According to an aspect of some embodiments there is provided a system for distributing a set of honeytoken-credentials to at least one client terminal for detecting a malicious attempt to obtain authentication to access a service providing server using login-credentials of the at least one client terminal in a network, comprising: an administrative server, comprising: a network interface for communication with the at least one client; a program store storing code; and a processor coupled to the network interface, and the program store, for implementing the stored code, the code comprising: code to transmit honeytoken-credential storing code from the administrative server to each of the at least one client terminal for implementation by a processor of each client terminal to store a set of honeytoken-credentials on a local memory of the respective client terminal, the set of honeytoken credentials including at least one valid login-credential and at least one invalid login-credential, the invalid login-credential being invalid for authentication of the client terminal, the valid login-credential being valid for authentication of the client.

Optionally, the system further comprises an administration database storing the valid login-credential, wherein the administration database is accessible to confirm the existence of the valid login-credential as an entry in the administrative database.

Optionally, the system further comprises a malicious event detection server, comprising: a monitoring interface for communication with a network monitoring device that monitors packets transmitted over the network, the packets including login-credentials of the at least one client terminal attempting to obtain authentication to access a service providing server; a program store storing code; and a processor coupled to the monitoring interface, and the program store, for implementing the stored code, the code comprising: code to identify a login-failure event based on an analysis of at least one transmitted packet received from the monitoring interface, wherein the login-failure event represents a failure by the at least one client terminal to obtain authentication to remotely login over the network to the service providing server; and to receive at least one login-credential associated with the identified login-failure event; code to analyze the at least one login-credential to determine whether the at least one login-credential matches the invalid login-credential of the set of honeytoken-credentials stored on the local memory of the client terminal; and code to identify a malicious event when the login-credential matches the invalid login-credential, and output an indication of the malicious event. Optionally, the network monitoring device is installed within the network to monitor packets transmitted to and from a key distribution center (KDC) in a Kerberos implementation of a computer network authentication protocol used to authenticate clients to service providing servers.

Optionally, the system further comprises a security authentication server that authenticates credentials of client terminals to access service providing servers, wherein the security authentication server comprises a MICROSOFT DOMAIN CONTROLLER; wherein the administrative server comprises a MICROSOFT ACTIVE DIRECTORY; and wherein the honeytoken-credential storing code is transmitted from the administrative server to the client terminals using MICROSOFT GROUP POLICY.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A computer-implemented method for detecting a malicious attempt to obtain authentication to access a service providing server using credentials of a user in a network, the method performed by a malicious event detection server analyzing packets transmitted over the network, the method comprising:

monitoring, via a network monitoring device, the packets transmitted over the network to identify at least one login-credential comprising a password associated with an attempt to obtain authentication to access the service providing server;

analyzing the password to determine whether the password matches an invalid login-credential comprising an invalid honeytoken-password included in a set of honeytoken-credentials, wherein the set of honeytoken-credentials includes the invalid honeytoken-password of the user and a valid login-credential comprising a username of the user, wherein the invalid honeytoken-password is invalid for authentication of the user to access the service providing server and the username is associated with the service providing server, and wherein the invalid honeytoken-password is selected from a set of invalid passwords comprising a currently expired old password of the user;
wherein the set of honeytoken-credentials comprising the invalid honeytoken-password of the user and the username of the user is stored on a local memory of a client terminal by honeytoken-credential storing code distributed over the network by an administrative server;
identifying a malicious event when the at least one login-credential matches the invalid login-credential of the set of honeytoken-credentials; and
outputting an indication of the malicious event, which triggers a security process by the malicious event detection server.

2. The computer-implemented method of claim 1, wherein the password included in the at least one login-credential is the invalid honeytoken-password.

3. The computer-implemented method of claim 1, further comprising:
identifying a login-failure event based on an analysis of at least one transmitted packet included in the packets,
wherein the login-failure event represents a failure by the user to obtain authorization to login to the service providing server, and
wherein the at least one login-credential is associated with the login-failure event.

4. The computer-implemented method of claim 1:
wherein the attempt to obtain authentication to access the service providing server comprises a rejection by a Kerberos server to authenticate an Authentication Service Request (AS-REQ) transmitted by the client terminal;
wherein the password included in the at least one login-credential is used to encrypt a timestamp in the AS-REQ; and
wherein the method further comprises:
decrypting an encrypted timestamp in the AS-REQ using the invalid honeytoken-password; and
identifying the malicious event when the invalid honeytoken-password successfully decrypts the encrypted timestamp indicating that the encrypted timestamp was encrypted using the password included in the at least one login-credential which matches the invalid honeytoken-password.

5. The computer-implemented method of claim 1:
wherein the attempt to obtain authentication to access the service providing server comprises a rejection by an NT LAN Manager (NTLM) server to authenticate a response to a challenge transmitted by the client terminal;
wherein the at least one login-credential comprises a hash of the password, which is used to encrypt the challenge;
wherein the invalid login-credential comprises a honeytoken-hash of the password; and
wherein the method further comprises:
computing a response to the challenge by encrypting the challenge using the honeytoken-hash to thereby generate an honeytoken-hash-encrypted challenge; and
identifying the malicious event when the honeytoken-hash-encrypted challenge matches the challenge encrypted using the hash of the password.

6. The computer-implemented method of claim 1, further comprising:
extracting the at least one login-credential from at least one network traffic packet included in the packets, the at least one network traffic packet being associated with the attempt to obtain authentication to access the service providing server by plaintext extraction from a field defined for storing the at least one login-credential.

7. The computer-implemented method of claim 6, wherein the attempt to obtain authentication to access the service providing server comprises a rejection by a Lightweight Directory Access Protocol (LDAP) server to authenticate the user.

8. The method of claim 1, wherein the username of the user is stored by a network administration database on a network connected server, and existence of the user is verifiable by querying the network administration database using the username.

9. The computer-implemented method of claim 1, further comprising:
providing a fake-service-providing server that mimics a real server but that provides a fake service;
in response to the at least one login-credential matching the invalid login-credential of the set of honeytoken-credentials, permitting access to the fake service of the fake-service-providing server; and
during a time period in which the particular entity is accessing the fake service of the fake-service-providing server, attempting to identify the particular entity;
wherein the set of invalid passwords from which the invalid honeytoken-password is selected further comprises:
a fake password that is designed according to a determined sophistication of the fake service, wherein:
the fake password is a simple invalid password when the fake service is an unsophisticated service, and
the fake password is a sophisticated invalid password when the fake service is a sophisticated service.

10. The computer-implemented method of claim 9, wherein the set of invalid passwords from which the invalid honeytoken-password is selected further comprises a leaked password that is known to have been leaked.

11. A computer-implemented method for distributing a set of honeytoken-credentials to at least one client for detection of a malicious attempt to access a service providing server using login-credentials of a user, the method performed by an administrative server that administers the at least one client in a network, the method comprising:
transmitting a network message that includes honeytoken-credential storing code from the administrative server to the at least one client for implementation by a processor of the at least one client to store the set of honeytoken-credentials on a local memory of the at least one client,
wherein the set of honeytoken-credentials includes at least one valid login-credential comprising a username of the user and at least one invalid honeytoken-pas sword, the at least one invalid honeytoken-pas sword being selected from a set of invalid passwords comprising a currently expired old password of the user,
wherein the at least one invalid honeytoken-pas sword is invalid for authentication of the user to obtain access to the service providing server,
wherein the username of the user is associated with the service providing server, and
wherein the set of honeytoken-credentials is used to detect the malicious attempt to access the service providing server when a received login-credential matches the at least one invalid honeytoken-pas sword and which triggers a security process by a security authentication server;

identifying the malicious attempt when the received login-credential matches the at least one invalid honeytoken-pas sword of the set of honeytoken-credentials; and outputting an indication of the malicious attempt, which triggers the security process by the security authentication server.

12. The computer-implemented method of claim 11, wherein the honeytoken-credential storing code comprises (i) instructions to initiate an impersonated login process to a remote server using the set of honeytoken-credentials and (ii) code to store the set of honeytoken-credentials on the local memory of the at least one client.

13. The computer-implemented method of claim 11, wherein the set of honeytoken-credentials is stored as unencrypted plaintext retrievable by a memory dump of the local memory.

14. The computer-implemented method of claim 11, wherein the set of honeytoken-credentials comprises an empty credential.

15. The computer-implemented method of claim 11, further comprising wrapping code in the transmitted network message in at least one of a script and binary encoding.

16. The computer-implemented method of claim 11, wherein at least one honeytoken credential in the set of honeytoken-credentials is stored in a field defined by a computer network authentication protocol used by the at least one client for authentication to the service providing server by the security authentication server, which is implementing the computer network authentication protocol.

17. The computer-implemented method of claim 11, wherein the honeytoken-credential storing code is an executable file that is executed once per computer boot of the at least one client.

18. The computer-implemented method of claim 11, wherein the network message includes instructions to execute the honeytoken-credential storing code to store the set of honeytoken-credentials on the local memory during each re-boot of the at least one client.

19. The computer-implemented method of claim 11, wherein the honeytoken-credential storing code stores the set of honeytoken-credentials in the local memory of the at least one client until reboot or shutdown.

20. The computer-implemented method of claim 11, wherein the network message includes instructions to execute the honeytoken-credential storing code as a start-up script executed during a boot-up.

21. The computer-implemented method of claim 11, wherein the honeytoken-credential storing code is executed as a background process at the at least one client to maintain the set of honeytoken-credentials in the local memory of the at least one client.

22. A system for distributing a set of honeytoken-credentials to at least one client terminal over a network to detect a malicious attempt to obtain authentication to access a service providing server using login-credentials of a user, comprising:

an administrative server, comprising:
a network interface for communication with the at least one client terminal;
a program store storing code; and
a processor coupled to the network interface and the program store to implement the code, the code comprising:
code to transmit honeytoken-credential storing code from the administrative server to the at least one client terminal for implementation by a processor of the at least one client terminal to store a set of honeytoken-credentials on a local memory of the at least one client terminal, wherein the set of honeytoken-credentials includes at least one valid login-credential comprising a username of the user and at least one invalid honeytoken-password, the at least one invalid honeytoken-pas sword being selected from a set of invalid passwords comprising a currently expired old password of the user, wherein the at least one invalid honeytoken-pas sword is invalid for authentication of the user, wherein the username of the user is associated with the service providing server, wherein a security authentication server is configured to perform authentication of the user for accessing the service providing server according to the username and a valid password and to trigger a security process when the login credentials of the user match the at least one invalid honeytoken-password;

code to identify the malicious attempt when the login credentials of the user match the at least one invalid honeytoken-password; and code to output an indication of the malicious attempt, which triggers the security process by the security authentication server.

23. The system of claim 22, further comprising an administration database storing the at least one valid login-credential, wherein the administration database is accessible to confirm existence of the at least one valid login-credential as an entry in the administrative database.

24. The system of claim 22, further comprising:
a malicious event detection server, comprising:
a monitoring interface for communication with a network monitoring device that monitors packets transmitted over the network, the packets including the login-credentials of the user, the login-credentials comprising a password associated with an attempt to obtain authentication to access the service providing server;
a second program store storing second code; and
a second processor coupled to the monitoring interface and the second program store to implement the second code, the second code comprising:
code to identify a login-failure event based on an analysis of at least one transmitted packet received from the monitoring interface, wherein the login-failure event represents a failure to obtain authentication to remotely login over the network to the service providing server and to receive at least one login-credential associated with the identified login-failure event;
code to analyze the at least one login-credential to determine whether a particular password included in the at least one login-credential matches the at least one invalid honeytoken-password; and
code to identify a malicious event when the particular password matches the at least one invalid honeytoken-password and to output an indication of the malicious event.

25. The system of claim 24, wherein the network monitoring device is installed within the network to monitor packets transmitted to and from a key distribution center (KDC) in a Kerberos implementation of a computer network authentication protocol used to authenticate users to service providing servers.

* * * * *